United States Patent Office 3,485,660
Patented Dec. 23, 1969

3,485,660
HEAT RESISTANT POLYPROPYLENE
Friedrich J. O. Engelhardt, Montgomery County, Md., assignor to the United States of America as represented by the Secretary of the Army
No Drawing. Filed Feb. 15, 1966, Ser. No. 529,183
Int. Cl. C09d 3/48; B44d 1/09
U.S. Cl. 117—118
3 Claims

ABSTRACT OF THE DISCLOSURE

The heat resistance of polypropylene is increased by graft-polymerizing styrene onto an oxidized polypropylene surface, alkylating the styrene-graft polymer with a vinyl dichlorosilane in the presence of a Friedel-Crafts catalyst, hydrolyzing the alkylated polymer, reacting the hydrolyzed alkylated polymer with a trichloro silane, and hydrolyzing the resultant product to form a cross-linked polysiloxane skin on the polypropylene surface.

---

The invention described herein may be used by or for the Government of the United States for governmental purposes without the payment of any royalties thereon to me.

The present invention relates to a method for increasing the heat resistance of polypropylene and the resultant heat-resistant polypropylene product.

Polypropylene, and articles made from polypropylene, while otherwise satisfactory, are readily deformed on exposure to heat. I have discovered that grafting styrene onto an oxidized polypropylene surface and reacting the grafted styrene with a vinyl dichloro silane followed by cohydrolysis after reaction with a trichloro silane yields a skin of cross-linked polysiloxane which increases the heat resistance of the surface of the polypropylene without substantially changing the properties of the underlying unmodified material.

It is therefore the primary object of the present invention to provide a novel method for increasing the heat resistance of polypropylene by forming a heat-resistant polysiloxane skin thereon.

These and other desirable objectives and advantages are obtained by the method of the present invention which comprises graft-polymerizing styrene onto an oxidized polypropylene surface, alkylating the styrene-graft polymer with a vinyl dichloro silane, hydrolyzing the alkylated polymer, reacting the hydrolyzed alkylated polymer with a trichloro silane, and hydrolyzing the resultant product to form a cross-linked polysiloxane skin on the polypropylene surface. The present invention also contemplates the products resulting from the herein described process.

The approach of the present invention is based upon the ability of the hydrogen atoms attached to the tertiary carbon atoms of the polypropylene polymer molecule to react with oxygen and form hydroperoxides. The resultant hydroperoxides decompose to various free radicals symbolized as R· which are reactive with polymerizable vinyl monomers and which initiate polymerization to form a graft polymer as shown:

$$R\cdot + nCH_2=CH \longrightarrow R-[-CH_2-CH-]_n-$$

The vinyl monomers employed in the process of the present invention are styrene compounds. Polystyrenes and copolymers of styrene are reactive with vinyl chloro silanes in the presence of the well known Friedel-Crafts catalysts such as aluminum chloride, aluminum bromide, boron trifluoride, et cetera. Reaction of the benzene nucleus grafted onto the polypropylene polymer molecule with the vinyl group of a vinyl dichloro silane introduces the —$CH_2$—$CH_2$—$SiCl_2$— group into the benzene ring, usually at the para position, as shown:

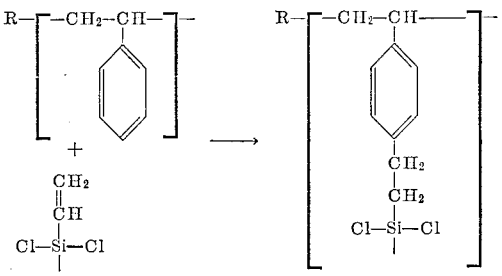

In the above formula, the fourth valence of silicon may be satisfied by means of an additional chloro substituent or by means of a lower-alkyl group such as methyl. It is also apparent from the above formula that the benzene ring can bear other substituents. Thus, styrenes bearing non-interfering substituents such as halo, alkoxy, alkyl and the like may be employed in the place of styrene in the process of the present invention.

Simple aqueous hydrolysis of the alkylated product shown in the above formula results in the displacement of chloro groups attached to silicon with hydroxyl groups. A siloxane structure is then provided by reacting the hydrolyzed product (via the silicon-attached hydroxyl group) with a trichloro silane, preferably in admixture with a dichloro silane. The remaining valences of the dichloro and/or trichloro silane are satisfied by means of alkyl and/or phenyl substituents.

Further hydrolysis and cohydrolysis of the above product with the previously mentioned chlorosilanes yields a cross-linked polysiloxane structure according to the well known silanol condensation reaction. The overall process provides a heat-resistant layer of cross-linked polysiloxane chemically bonded onto the initially oxidized polypropylene surface. Such a surface may have been present as a sheet, a molded shape or other article fabricated of polypropylene.

My invention is further illustrated by means of the following non-limiting examples utilizing injection molded nose-cones as representative of articles made of polypropylene.

After washing for 10 minutes in boiling methanol and acetone, polypropylene nose cones were placed in a reaction kettle equipped with a gas inlet tube, reflux condenser, thermometer, and magnetic stirrer. A solution of 1500 milliliters of cumene, 70 milliliters of methanol and 0.5 gram of cumene hydroperoxide was added to the kettle and the contents heated to 65–75° C. Air was bubbled through the heated solution for 4 hours. After cooling the solution, the cones were taken out and stored in an oven at 70° C. for 12 hours.

In a reaction kettle similar to that described above, oxidized cones prepared as above, or by other known methods, were immersed in monomeric styrene under nitrogen. The reaction vessel was placed in a water bath and the inside temperature was kept at 80° C. for 48 hours. After cooling, the cones were washed thoroughly with hot acetone to remove styrene homopolymer and dried to constant weight. An average increase in weight of 3.52% and an average increase in thickness of 0.09–0.10 millimeter due to grafting were observed.

The styrene-grafted cones were placed in a reaction vessel equipped with a magnetic stirrer and protected by a drying tube, and which contained 282 grams (2.0 mole) of vinyl methyl dichloro silane and 8.0 grams of anhydrous sublimed aluminum trichloride at a temperature of 70° C. After 10 minutes, the unreacted vinyl methyl dichloro silane was removed by extraction (taking precautions to exclude moisture) with dry ether or hexane. The alkylated cones were stored for three days in an evacuated desiccator over paraffin wax in order to complete removal of the solvent. From the observed increase in weight of the cones, it was determined that 40% of the phenyl groups of the polystyrene had reacted with methyl vinyl dichloro silane.

The alkylated cones were hydrolyzed by stirring for 30 minutes with a body of water. After drying for two hours in an oven at 80° C., the cones were placed in a solution containing 60 grams of phenyl trichloro silane and 40 grams of dimethyl dichloro silane in 100 grams of dry hexane. The cones were removed after 15 minutes and the last traces of the hexane solvent evaporated in a desiccator. The cones were stirred with water for one hour and then with 60% sulfuric acid for ten minutes at 15° C. After a thorough washing with water and methanol, the cones were dried for 12 hours in an oven at 80° C. The thus treated polypropylene cones exhibited an average weight increase of 5.61–5.77% and an average increase in thickness due to the formation of a polysiloxane skin of 0.15–0.16 millimeter.

The modified polypropylene articles were tested as follows:

Tensile-strength measurements were carried out at room temperature according to ASTM D638 on samples of the polypropylene starting material and on samples which were reacted with styrene and chloro silanes as described Treatment according to the process of the invention did not adversely affect the tensile strength of the treated articles as shown:

|   | Unreacted polypropylene, tensile strength, p.s.i. | Reacted polypropylene, tensile strength, p.s.i. |
|---|---|---|
| 1 | 5,750 | 5,700 |
| 2 | 5,570 | 5,230 |
| 3 | 5,450 | 5,710 |

The heat resistance of treated and untreated cones was measured by exposing the cones to a hot air source consisting of a fan and an electrical heating system positioned 5 inches from and at the same height as the test cone. A thermocouple was positioned 1 millimeter in front of the nose-cone center. In each experiment, the test cone was fastened at the upper end of a ring-stand, some distance above the hot-air stream, and the hot-air generator turned on and adjusted so that the thermocouple indicated a constant temperature of 300° C. The cones were then lowered to the test position in the hot air stream and held there for exposure times of 2 and 5 minutes. The change in heat resistance was determined visually by comparing a treated and an untreated nose-cone after the same exposure time.

The results of tests with untreated polypropylene cones showed that the hot air stream caused destruction of the exposed area after 2 minutes while cones treated according to the process of the invention showed no change under the same conditions. Some deformation occurred in the treated cones after 5 minutes attributed to softening of the polypropylene underneath the polysiloxane skin. The observed heat resistance of the treated polypropylene cones was comparable to that of polytrichlorofluoroethylene and irradiated polyethylene when subjected to the same test.

The improved heat resistance of polypropylene treated according to the process of the invention resides in the outer skin. However, the melt-flow of the sub-surface polypropylene is retarded by the skin-effect without adversely affecting its properties. Accordingly, low molecular weight polypropylene, which is less sensitive to thermal shock and stress-cracking than is high molecular weight polypropylene, may be modified by the process of the present invention to give a product having higher heat and stress-cracking resistance than that exhibited by high molecular weight polypropylene.

The polyfunctional polymeric chlorosilanes obtained by reaction of the intermediate styrene-graft polymer with vinyl chloro silanes undergo the same general reactions, such as esterification with alcohols, hydrolysis and cohydrolysis with other halosilanes, as exhibited by non-polymeric chloro silanes. Utilizing such reactions, and by varying the styrene reactant and the chloro silanes employed for cohydrolysis, it is possible to prepare polysiloxane skins exhibiting a wide range of desirable properties.

The above-offered discussion and examples have been presented for the purpose of illustrating the present invention. My invention is not limited to any particular theoretical mode of operation and is as defined by the following claims.

I claim:

1. A method for increasing the heat resistance of polypropylene which comprises graft-polymerizing styrene onto an oxidized polypropylene surface, alkylating the styrene-graft polymer with a vinyl dichlorosilane in the presence of a Friedel-Crafts catalyst, hydrolyzing the alkylated polymer, reacting the hydrolyzed alkylated polymer with a trichloro silane, and hydrolyzing the resultant product to form a cross-linked polysiloxane skin on the polypropylene surface.

2. A method for increasing the heat resistance of polypropylene which comprises graft-polymerizing styrene onto an oxidized polypropylene surface, alkylating the styrene-graft polymer with vinyl methyl dichlorosilane in the presence of a Friedel-Crafts catalyst, hydrolyzing the alkylated polymer, reacting the hydrolyzed alkylated polymer with a mixture of dichloro and trichloro silanes, and hydrolyzing the resultant product to form a cross-linked polysiloxane skin on the polypropylene surface.

3. A heat-resistant polypropylene article made by graft-polymerizing styrene onto an oxidized polypropylene surface, alkylating the styrene-graft polymer with a vinyl dichlorosilane in the presence of a Friedel-Crafts catalyst, hydrolyzing the alkylated polymer, reacting the hydrolyzed alkylated polymer with a trichloro silane, and hydrolyzing the resultant product to form a cross-linked polysiloxane skin on the polypropylene surface.

References Cited

UNITED STATES PATENTS

| 2,921,870 | 1/1960 | Baum et al. |
| 2,987,501 | 6/1961 | Ricke et al. |
| 3,075,948 | 1/1963 | Santelli. |
| 3,199,701 | 8/1965 | Santelli. |

ALFRED L. LEAVITT, Primary Examiner

J. A. BELL, Assistant Examiner

U.S. Cl. X.R.

117—136, 138.8, 161; 260—827